J. N. NEWSOM.
PNEUMATIC TIRE CASING REPAIR DEVICE.
APPLICATION FILED JAN. 29, 1912.

1,084,895.

Patented Jan. 20, 1914.

ATTEST:—
Louis W. Hottel
M. P. Smith

INVENTOR:—
Joseph N. Newsom

UNITED STATES PATENT OFFICE.

JOSEPH N. NEWSOM, OF ST. LOUIS, MISSOURI, ASSIGNOR OF ONE-FOURTH TO FRANK NIEMANN, OF ST. LOUIS, MISSOURI, AND ONE-FOURTH TO LOUIS W. HOTTEL, OF CHICAGO, ILLINOIS.

PNEUMATIC-TIRE-CASING-REPAIR DEVICE.

1,084,895.  Specification of Letters Patent.  Patented Jan. 20, 1914.

Application filed January 29, 1912. Serial No. 674,117.

*To all whom it may concern:*

Be it known that I, JOSEPH N. NEWSOM, a citizen of the United States, residing at St. Louis, State of Missouri, have invented certain new and useful Improvements in Pneumatic-Tire-Casing-Repair Devices, of which the following is a full, clear, and exact description, reference being had to the accompanying drawings, forming a part of this specification.

This invention relates to a device particularly intended for use in repairing casings of inflatable tires, such as are ordinarily used on motor vehicles, the principal object of my invention being to provide an inflatable bag and a collapsible casing therefor, which parts are properly assembled and inserted within the casing of the tire to be repaired, after which the inner bag is inflated within its casing, thereby providing a substantial form and support within the tire casing, while the same is being repaired and while it is in position within the vulcanizing apparatus.

By my improved construction the inflatable bag of the repair device can be easily and quickly placed in position within its casing and if said bag becomes unfit for service by reason of puncture, it can be easily and cheaply repaired and re-used, thereby obviating the necessity of providing an entirely new repair device.

The outer casing of my improved device is collapsible and of such form and size as to permit of its being placed in position within the tire casing, and it is curved slightly throughout its length in order that it will snugly fit within the casing undergoing repairs.

To the above purposes my invention consists in certain novel features of construction and arrangement of parts hereinafter more fully described and claimed.

Figure 1:
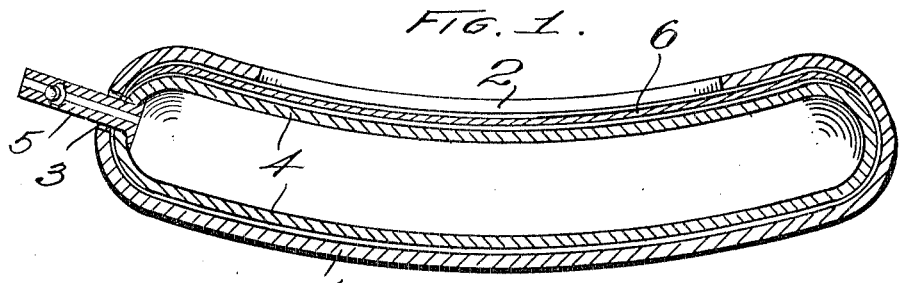
Figure 2:
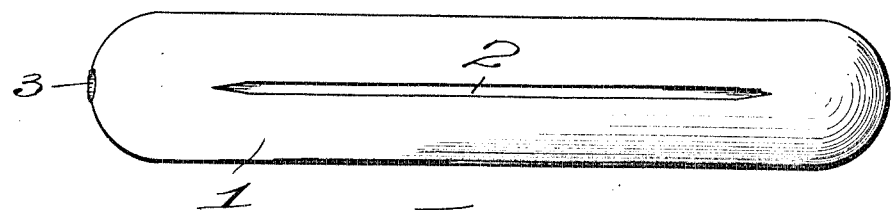
Figure 3:
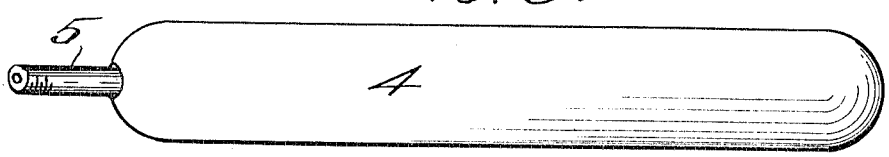
Figure 5:
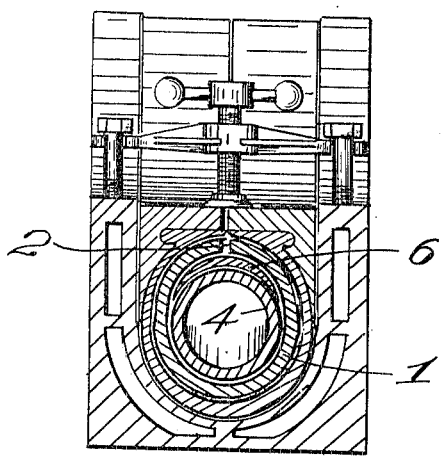
Figure 4:
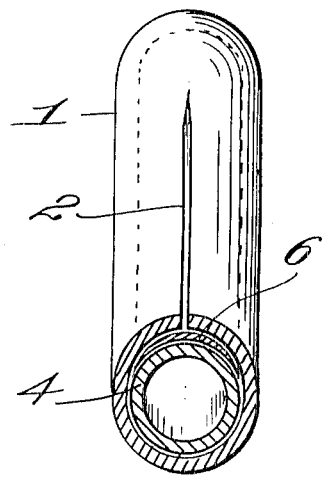

In the drawings, Figure 1 is a vertical section taken through the center of a repair device of my improved construction. Fig. 2 is a plan view of the outer casing of the device. Fig. 3 is a plan view of the inflatable bag forming a part of the device. Fig. 4 is a cross-section taken through the center of the device, and, Fig. 5 is a cross-section of a vulcanizing apparatus and showing my improved device used in connection therewith.

Referring by numerals to the accompanying drawings, 1 designates the outer casing of the device which is tubular in form, closed at both ends and slightly curved throughout its length in order to fit snugly within the tire casings which are to be repaired. This casing 1 is preferably formed of rubber properly vulcanized, or a combination of rubber and fabric, and is flexible so as to be partially collapsed when positioned within or removed from a tire casing undergoing repairs. Formed in the top of this casing 1 is a longitudinally extending slot 2, through which the inflatable bag is inserted or removed. Formed through one end of the casing 1 is an aperture 3 adapted to receive the valve carried by the inflatable bag whereby air may be pumped into said bag.

4 designates the inflatable bag which is preferably constructed of soft rubber or a combination of rubber and fabric, and said bag is of such size as to fit snugly within the casing 1 when inflated. Carried by one end of the inflatable bag is a tubular valve 5 through which air may be pumped to inflate said bag, and when said bag is properly positioned within the casing this valve projects through the aperture 3 as shown in Fig. 1.

6 designates a pad of leather or analogous material which is curved transversely and longitudinally, and said pad is positioned between the casing 1 and the inflatable bag 4, immediately beneath the slot 2, for the purpose of maintaining the bag 4 in proper position within the casing 1, when said bag is inflated.

In the use of my improved device the casing 1 containing the deflated bag 4 and pad 6 is positioned within the tire casing to be repaired and said casing 1 is adjusted to the proper point, after which air is pumped into the inflatable bag through the tubular valve stem 5 thereby inflating said bag and consequently distending the casing 1. By pumping up a certain amount of pressure within the bag 4, a very firm, substantial form and support is provided within the casing undergoing repairs, and for this reason the fabric and soft rubber, or gum used in making the patch on the tire casing can be readily applied, and when properly positioned, said fabric and soft rubber is supported in a firm and substantial manner at the desired point. The casing undergoing repairs, with the patch of fabric and soft rubber is now positioned in the vulcanizing apparatus and left until the patch has been perfectly cured or vulcanized, after which the casing is removed from the apparatus and the repair device is removed from said casing.

A repair device of my improved construction is comparatively simple, can be made in various sizes to suit different requirements, can be readily placed in and removed from operative position, and in case the inflatable bag becomes unserviceable by reason of puncture it can be readily repaired by a workman with little or no expense thereby avoiding the necessity of obtaining an entirely new repair outfit.

It will be readily understood that minor changes in the size, form and construction of the various parts of my improved repair device may be made and substituted for those herein shown and described without departing from the spirit of my invention, the scope of which is set forth in the appended claim.

I claim—

In a device of the class described the combination with an outer casing constructed wholly of flexible material and having a smooth rounded outer surface and provided in its side with a longitudinally extending slit and in its end with an aperture, of an inflatable member adapted to be inserted and removed through the slit in the side of the casing, a tube connected to one end of said inflatable member whereby air may be delivered into said inflatable member while positioned within the casing, which tube projects through the aperture in the end of the casing, and a separate detachable pad adapted to be inserted and removed through the slit in the side of the outer casing, and which pad is adapted to be positioned within the casing beneath the slit to close said slit when the inflatable member is inflated.

In testimony whereof I hereunto affix my signature in the presence of two witnesses, this 23d day of January, 1912.

JOSEPH N. NEWSOM.

Witnesses:
Louis W. Hottel,
M. P. Smith.